United States Patent
Pearce et al.

[11] Patent Number: 5,935,630
[45] Date of Patent: *Aug. 10, 1999

[54] JUICE AND JUICE AROMA CONCENTRATE PRODUCTION

[75] Inventors: Steven Pearce, Glemsford; Johnnie Darren Bullen, Bury St. Edmunds, both of United Kingdom

[73] Assignee: Britannia Natural Products Limited, Suffolk, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/735,575

[22] Filed: Oct. 23, 1996

Related U.S. Application Data

[63] Continuation of application No. 08/458,771, Jun. 2, 1995, abandoned.

[30] Foreign Application Priority Data

Jun. 2, 1994 [GB] United Kingdom .................... 9411020

[51] Int. Cl.$^6$ ................................ A23L 1/015; A23L 2/08
[52] U.S. Cl. .................................... 426/330.5; 426/330.6; 426/478; 426/492; 426/599
[58] Field of Search .............................. 426/330.5, 330.6, 426/599, 478, 492

[56] References Cited

U.S. PATENT DOCUMENTS

| | | | |
|---|---|---|---|
| 3,979,521 | 9/1976 | Sakaguchi et al. | 426/15 |
| 4,401,678 | 8/1983 | Beaumont | 426/15 |
| 4,925,690 | 5/1990 | Odake | 426/599 |
| 4,933,197 | 6/1990 | Walker | 426/599 |

FOREIGN PATENT DOCUMENTS

| | | |
|---|---|---|
| 0 069 523 | 1/1983 | European Pat. Off. . |
| A-2273066 | 12/1975 | France . |
| A-2523720 | 11/1975 | Germany . |
| A-50154494 | 12/1975 | Japan . |
| A-7506315 | 2/1975 | Netherlands . |
| 1 071 458 | 6/1967 | United Kingdom . |
| 1 177 126 | 1/1970 | United Kingdom . |
| 1 345 276 | 1/1974 | United Kingdom . |
| 1 352 009 | 5/1974 | United Kingdom . |
| 1 361 674 | 7/1974 | United Kingdom . |
| 1505382 | 5/1975 | United Kingdom . |
| 1 454 792 | 11/1976 | United Kingdom . |
| 1 463 324 | 2/1977 | United Kingdom . |
| 2133 418 | 7/1984 | United Kingdom . |
| 91/10373 | 7/1991 | WIPO . |

OTHER PUBLICATIONS

Sheu, M.J., et al., "Preconcentration of Apple Juice by Reverse Osmosis," J. of Food Science, 1983, 48 (2), 422–429.

Block B.C., "Orange juice concentration by reverse osmosis," Chemical Abstracts, 1974, 81 (9), 363. (Int. Fruchtsaftunion, Wiss.–Tech. Komm., Ber. 1973, 13, 119–45).

*Primary Examiner*—Helen Pratt
*Attorney, Agent, or Firm*—Nath & Associates; Gary M. Nath; Todd L. Juneau

[57] ABSTRACT

A method of concentrating juice or juice water phase comprising subjecting juice or juice water phase to reverse osmosis, characterized in that the reverse osmosis is carried out at a temperature of from 12 to 18° C. and at a pressure of from 15 to 50 bar.

8 Claims, 1 Drawing Sheet

JUICE AND JUICE AROMA CONCENTRATE PRODUCTION

This application is a Continuation of U.S. patent application Ser. No. 08/458,771, filed Jun. 2, 1995, now abandoned.

BACKGROUND OF THE INVENTION

1. Field of the Invention

The invention relates to a method of producing juice concentrates and juice aroma concentrates.

2. Description of the Prior Art

The standard method of producing natural fruit and vegetable juice concentrates is by means of distillation using temperatures of between 80 and 150° C. However, since most flavour and aroma molecules are heat-sensitive and volatile, use of such high temperatures may result in degradation or total loss of the juice flavours and aromas which the process is aiming to recover and concentrate.

Many of the volatile, but very desirable, juice flavours and aromas are taken off in the distillate (the juice water phase) and it is known to concentrate this water phase, usually by fractional distillation, in order to obtain what is known as a 'juice aroma concentrate' which may then be used, for example, as a flavouring in the food processing industry.

Although distillation is the standard method of producing these concentrates, a process known as reverse osmosis has also been proposed. In this process, the juice or juice water phase to be concentrated is passed over a semi-permeable membrane under pressure to 'squeeze out' the water from the mixture leaving behind a concentrated solution containing the flavours and aromas.

The applicant has found that one problem with known reverse osmosis methods is that the high pressures used, i.e. above 50 bar, may adversely affect the delicate flavour and aroma molecules so that the concentrate obtained no longer resembles the original starting material. In addition, use of high pressure results in increased temperatures which is also disadvantageous as explained above.

It is an object of the present invention to provide a method of producing improved juice concentrates and juice aroma concentrates.

SUMMARY OF THE INVENTION

Accordingly, the present invention provides a method of concentrating juice or juice water phase comprising subjecting juice or juice water phase to reverse osmosis, characterized in that the reverse osmosis is carried out at a temperature of from 5 to 20° C.

From another aspect, the invention provides a method of concentrating juice or juice water phase comprising subjecting juice or juice water phase to reverse osmosis, characterized in that the reverse osmosis is carried out at a pressure of from 15 to 50 bar.

From a further aspect, the invention provides a method of concentrating juice or juice water phase comprising subjecting juice or juice water phase to reverse osmosis, characterized in that the reverse osmosis is carried out at a temperature of from 5 to 20° C., preferably 12 to 18° C., and at a pressure of from 15 to 50 bar.

The applicant has found that using this method improved concentrates are produced in which more of the original juice flavours and aromas are retained. Because the concentrates have improved flavours and aromas they are more versatile than known concentrates and have wider uses, e.g. as flavourings for the food processing industry but also as natural fragrances for use in the cosmetics industry.

In this context, the word 'juice' covers any aqueous solution which may require concentrating, such as a fermentation broth, a product from a biotechnological reaction, or an aqueous solution derived from fruit or vegetable juice.

In addition, the word 'juice' covers essences, waters and water phase products resulting from essential oil production, for example rose water, chamomile water, peppermint water and buchu water. Essential oils may be extracted from almost any part of a plant, e.g. buds, berries, leaves, roots, flowers, etc. Usually this extraction is carried out by a process of steam distillation in which the raw material is heated and extracted with water or live steam or both. The oil and the water distil over together and are cooled by the condenser. The oil separates from the water leaving the water saturated with interesting components from the oil. The water can be recycled through further production to increase the efficiency of the extraction but the applicant has found that it can also be concentrated by reverse osmosis to make a useful ingredient for flavourings for the food industry and for fragrances for cosmetic and toiletry applications.

The reverse osmosis may be carried out using conventional apparatus, but with a membrane having a pore size of preferably from 100 to 200 Daltons, more preferably at or below 150 Daltons.

Preferably the pressure used is from 35 to 45 bar, more preferably 40 bar. The temperature is preferably from 12 to 18° C., more preferably 15° C.

From another aspect the invention provides a juice concentrate or juice aroma concentrate prepared by any one of the methods given above. Preferably the concentrate comprises at least 50% water, more preferably at least 90% water.

BRIEF DESCRIPTION OF THE DRAWINGS

The invention is illustrated, by way of example, in the accompanying drawings in which.

DETAILED DESCRIPTION OF THE DRAWINGS

Figures 1, 2:
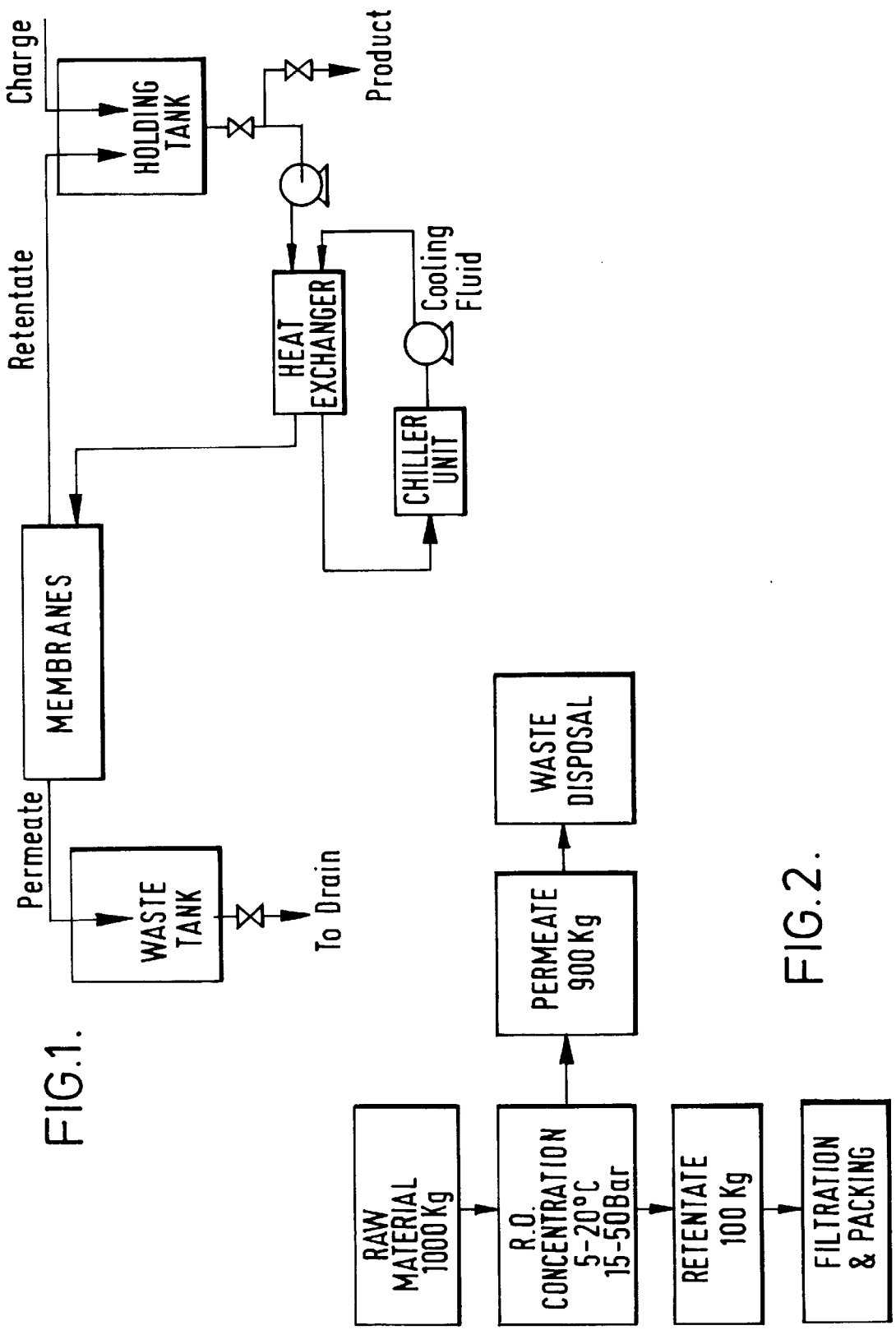
FIG. 1 is a diagrammatic representation of a reverse osmosis method according to the invention.
FIG. 2 is a diagrammatic representation of the concentration stages of a reverse osmosis method according to the invention.

Referring to the drawings, 1000 Kg of orange juice water phase (commercial product) is placed in a holding tank. From here it is pumped, at a pressure of 40 bar, through a heat exchanger where it is cooled to 15° C. and is then pumped at the same pressure onto the reverse osmosis apparatus.

The reverse osmosis apparatus comprises four stainless steel tubes, each one 3.6 m long and each one containing seventeen semi-permeable membranes. The pore size of the membranes is approximately 100 Daltons.

The juice water phase is pumped through the reverse osmosis apparatus; the retentate containing the flavours and aromas is returned to the holding tank while the permeate passes to waste. Re-circulation of the retentate through the reverse osmosis apparatus is carried out until a tenfold concentration (100 Kg) is obtained, thus giving an orange juice aroma concentrate product.

It will, of course, be appreciated that the method may be used to concentrate a variety of materials and that the reverse osmosis apparatus suitable for carrying out the method is not limited to the one described above but may take several forms.

The concentrates may, for example, be used as flavourings or ingredients for flavourings in the food processing industry, i.e. may be added to fruit juices, yoghurts, fromage frais, beverages, in particular clear 'new age' beverages, etc, or as natural fragrances in the cosmetics industry.

Thus, the invention provides a method for concentrating juices and juice aroma concentrates which is simple but effective and economical.

We claim:

1. A method of concentrating juice water phase, wherein the juice water phase is a distillate resulting from essential oil production or juice aroma concentration wherein oil and water distill over together and are cooled by a condenser and wherein the oil separates from the water leaving the water saturated with components from the oil, the method consisting essentially of subjecting juice water phase to reverse osmosis, characterized in that the reverse osmosis is carried out at a temperature of from 12 to 18° C. and at a pressure of 15 to 50 bar; and recovering a juice water phase concentrate containing at least 50% water.

2. The method of claim 1, wherein the reverse osmosis is carried out at a pressure between about 35 bar and about 45 bar.

3. The method of claim 1, wherein the reverse osmosis is carried out at a pressure of about 40 bar.

4. The method of claim 1, wherein the reverse osmosis is carried out at a temperature of about 15° C.

5. The method of claim 1, wherein the reverse osmosis is carried out using a membrane having a pore size between about 150 and about 200 Daltons.

6. The method of claim 5, wherein the reverse osmosis is carried out using a membrane having a pore size of about 155 Daltons.

7. The method of claim 1, wherein the distillate is the aqueous phase derived from fruit or vegetable juice.

8. The method of claim 1, wherein said juice water phase concentrate contains at least 90% water.

* * * * *